United States Patent [19]

Jakobowski

[11] Patent Number: 4,987,405
[45] Date of Patent: Jan. 22, 1991

[54] ELEVATED BRAKE LIGHT SIGNAL MODULE

[76] Inventor: Walter T. Jakobowski, 1208 Orange Isle, Ft. Lauderdale, Fla. 33315

[21] Appl. No.: 532,876

[22] Filed: Jun. 4, 1990

[51] Int. Cl.$^5$ .............................................. B60Q 1/44
[52] U.S. Cl. .................................... 340/479; 340/463
[58] Field of Search ........................ 340/479, 464, 463

[56] References Cited

U.S. PATENT DOCUMENTS

| | | |
|---|---|---|
| 3,305,829 | 2/1967 | Knez . |
| 3,382,405 | 5/1968 | Johnson . |
| 3,460,089 | 8/1969 | Gregory . |
| 3,501,742 | 3/1970 | Ellison . |
| 3,576,527 | 4/1971 | Howard . |
| 3,629,840 | 12/1971 | Sakarai . |
| 3,693,151 | 9/1972 | Hasegawa . |
| 3,914,739 | 10/1975 | Caughlin ............................ 340/479 |
| 4,346,365 | 8/1982 | Ingram . |
| 4,403,210 | 9/1983 | Sullivan .............................. 340/479 |
| 4,600,913 | 7/1986 | Caine . |
| 4,651,129 | 3/1987 | Wood et al. ........................ 340/479 |
| 4,663,609 | 5/1987 | Rosario ............................... 340/479 |
| 4,791,401 | 12/1988 | Heidman, Jr. . |
| 4,956,633 | 9/1990 | Waterson et al. ............. 340/479 X |

Primary Examiner—Joseph A. Orsino
Assistant Examiner—Brian R. Tumm
Attorney, Agent, or Firm—Warren F. B. Lindsley

[57] ABSTRACT

An elevated third brake light flashing module for motor vehicles which is actuated by application of the brakes and employs a MOSFET transistor normally energized to pass current to the brake light but which is controlled in a simple manner by an oscillator and counter to cause the brake light to flash rapidly for a predetermined number of times followed by a prolonged "on" period in a sequential manner as long as pressure is applied to the brake pedal of the vehicle.

4 Claims, 1 Drawing Sheet

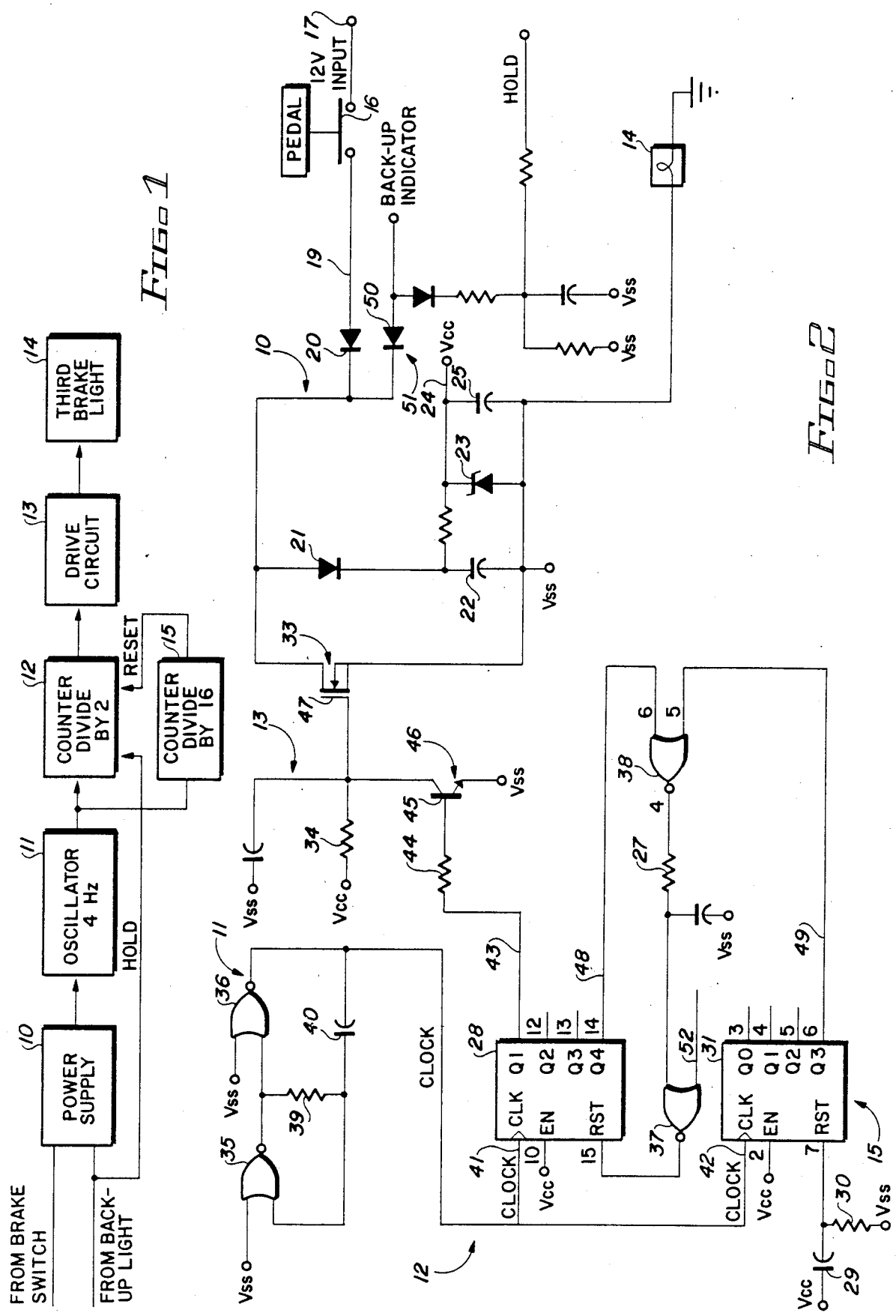

ELEVATED BRAKE LIGHT SIGNAL MODULE

BACKGROUND OF THE INVENTION

This invention relates to vehicle warning lights and more particularly to an elevated rear brake light device that flashes according to a particular pattern.

Brake lights are turned on at the taillights when the brakes are applied and are held on until the brakes are released. The problem with this arrangement is that when the brake lights are illuminated they initially gain the attention of the following driver, but they fail to hold his or her attention. This lack of attention often results in rear-end collisions. Additionally, when the brakes are applied they merely increase the intensity of the automobile's rear running lights. Thus, after the brake lights have been illuminated for some time, and especially in limited visibility conditions such as fog, smoke, or intense sun light, following drivers may have difficulty distinguishing whether the brakes are applied or not. Often drivers in traffic for long periods of time become mesmerized by the road, and do not readily recognize the increased taillight intensity, when the brakes are applied by a leading or stopped vehicle. Thus, a following car can approach another car, and even though the car in front has its brakes applied, the driver of the following car may not become aware of the stopped car until it is too late to avoid a collision.

Also, there is no visual warning signal to alert oncoming drivers that a vehicle is backing up, other than backup lights. Backup lights by themselves are not warning lights, because of their location and color and they provide very little warning to oncoming drivers or pedestrians.

Thus, a need exists for a signal that when the brakes are applied, or when the vehicle is backing, attracts and holds the attention of the following drivers, thereby helping to prevent rear end collisions.

It is the intention of this invention to use the existing high level brake light as the visual medium for this prescribed signal. When the brakes are applied or when reverse is selected, the in-line module emits a signal through the high level brake light to alert and warn following drivers of pedestrians.

An additional advantage of this automated signal is that the driver can direct his/her maximum braking effort and attention to stopping, while a following driver is simultaneously alerted to a hazardous condition.

Essentially, this signal device warns the following drivers of the six most hazardous driving conditions, namely vehicles:
1. Slowing down.
2. Stopped at signal lights.
3. Momentarily pulled over to the side of the road with their driver's foot on the brakes.
4. Backing while parallel parking.
5. Backing from a driveway into a thoroughfare.
6. Backing in parking lots.

This new high level brake light signal device must be inexpensively produced and easily installed on a vehicle. The operation of the signal module should be silent so as not to disturb the occupants of the vehicle.

DESCRIPTION OF THE PRIOR ART

Although the prior art discloses different types of rearwardly directed vehicle warning devices, none are inexpensively produced and can be easily installed in the present braking system with little effort.

U.S. Pat. No. 4,651,129 discloses a motor vehicle light assembly designed to be used in addition to the vehicle's conventional brake lights. A housing mounted inside the rear window of the vehicle contains a central light which burns continuously when the brake pedal is depressed. Two outer lamps are arranged to switch on and off for a predetermined number of times when the brake is applied and then to burn steadily as long as the brakes are applied. The system is reset when the brake pedal is released.

U.S. Pat. No. 4,663,609 shows an auxiliary or trunk mounted light which is caused to flash, along with the existing brake light when the brake pedal is depressed.

U.S. Pat. No. 3,501,742 discloses a rear window mounted signal unit having a central red lens which is caused to flash when a brake is applied and an inertia switch which indicates deceleration at a predetermined rate.

Other patents of general interest are listed below:

| | |
|---|---|
| 4,403,210 | 3,914,739 |
| 4,791,401 | 4,600,913 |
| 4,346,365 | 3,693,151 |
| 3,629,840 | 3,576,527 |
| 3,460,089 | 3,382,405 |
| 3,305,829 | |

Although the above patents disclose motor vehicle light assemblies designed to operate in addition to the vehicle's conventional brake lights, none disclose the simple and easily installed flashing third brake light assembly disclosed and claimed herein.

SUMMARY OF THE INVENTION

In accordance with the invention claimed, a new and improved control system for a high level vehicle brake light signal assembly is disclosed that functions to blink this third brake light a number of times, such as three, upon applying the brakes and then holds this third brake light in an "on" condition for a predetermined period of time and then sequentially repeats the blinking and "on" light sequence. The control system uses a pulse counting arrangement in which the light system is normally "on", but is turned off successively with the count and then is held in the "on" condition for a given period of time.

It is, therefore, one object of this invention to provide a new and improved means for controlling the illumination of a third elevated brake light upon the application of the vehicle's brakes.

Another object of the invention is to provide a control module for a high level third brake light which can be readily connected to existing automobile signal lighting systems by merely interrupting the circuit to the braking light.

A further object of this invention is to provide an elevated third brake light pulsing circuit which, when inserted by error incorrectly into a convention motor vehicle lighting system, will not destroy the normal brake light function.

Further objects and advantages of this invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a block diagram of the present invention; and

FIG. 2 is an electric circuit diagram showing the details contained in the various blocks of FIG. 1.

DESCRIPTION OF THE PREFERRED EMBODIMENT

Referring more particularly to the drawing by characters of reference, FIGS. 1 and 2 disclose an elevated third brake light warning system for a motor vehicle which causes this light to flash and remain on for a predetermined time and then to repeat the sequence in a manner to attract the attention of a driver to the rear of the vehicle.

FIG. 1 discloses a power supply 10 activated by a brake switch which, when closed, causes an electric current to flow through an oscillator 11 and counter 12 to a drive circuit 13 which energizes and controls a high level third brake light 14 mounted on the rear of a vehicle.

The counter 12 is controlled by a further counter 15 both of which may be part of a single chip which cyclically interrupts the current flow to brake light 14 causing the light to blink or flash on and off in a predetermined pattern. The flashing or blinking sequence followed by a predetermined "on" condition is repeated until the brake pedal is released by the driver. When the brake switch is opened by the action of the brake pedal the brake light 14 goes out and the counters reset.

FIG. 2 illustrates in more detail the functioning of the block diagram illustrated in FIG. 1.

Flashing Mode

When brake switch 16 is closed upon depression of the vehicle brake pedal, the positive terminal of the associated vehicle's 12 volt battery source of electric power is connected to terminal 17 and current flows through line 19 to and through diodes 20 and 21 which charges capacitor 22 causing a voltage drop of 6.2 volts across zener diode 23 which supplies a voltage Vcc at terminal 24 for the brake light control circuit. Capacitor 25 connected across zener diode 23 provides a filtered supply voltage Vcc for the control circuit. At the same time, capacitors 26 and 29 begin charging through resistors 27 and 30, respectively causing counters 28 and 31 to reset.

As should be noted, a MOSFET transistor 33 is connected across the series connection of diode 21 and capacitor 22 such that its gate is charged through resistor 34 to render it conductive and brake light 14 energized. Thus, there is a two millisecond delay before energizing lamp 14, i.e., it is energized two milliseconds after the brake pedal of the vehicle is depressed. It is this transistor that controls the flashing of third brake light 14.

As noted from FIGS. 1 and 2, brake light 14 is controlled by oscillator 11 embodying NORgates 35 and 36 which together form a free running oscillator which controls the flashing pattern of the circuit by rendering conductive and non-conductive MOSFET transistor 33.

NORgates 35 and 36 form a clocking arrangement for counters 28 and 31 the control and resetting of which are controlled by NORgates 37 and 38.

Resistor 39 and capacitor 40 connected as shown in FIG. 2 with NORgates 35 and 36 control the flash rate of the lamp, i.e. the oscillations of the counter and provide a clock signal to the clock input terminals 41 and 42 of counters 28 and 31.

The output terminal 43 of counter 28 is used to provide a signal through resistor 44 to base 45 of transistor 46 causing a current to flow through its anode and cathode terminals to provide a signal to gate 47 of MOSFET transistor 33 which renders transistor 33 non-conductive. This interruption of the conduction of transistor 33 interrupts the current flow to third brake light 14 connected to terminal 18, causing it to go out. Counter 28 interrupts the current flow or signal through transistor 44 to the base of gate 33 in a predetermined sequence, i.e., a pattern of three sequential timed counts to cause a flashing of light 14.

When a count of sixteen is reached on both counters 28 and 31, counter 28 gets reset until output terminals 48 and 49, respectively, get cleared. This provides an "on" time for brake light 41 of approximately four seconds.

This cycle continues until the brake pedal is released.

Back-Up Flasher

When the transmission of the vehicle is placed in reverse, a positive voltage from the 12 volt source is applied to anode 50 of diode 51 thereby providing power to the back-up flasher circuit just described. The only difference from the brake flasher circuit is that as long as the transmission of the vehicle is placed in reverse the third brake light continues to flash. This is accomplished by providing a positive input signal to terminal 52 of NORgate 37 disabling the reset of counter 28.

In summary, a simple control module is provided for flashing an elevated third brake light which energizes the brake light immediately upon depression of the brake pedal of the vehicle. Simultaneously with the energization of the brake light the counters are reset to zero.

To obtain a flashing of the third brake light the MOSFET transistor, normally conductive and through which the load current to the third brake light flows, is interrupted in a predetermined sequence by the counters which are in turn controlled by the oscillator.

Thus, a simple solid state control circuit provides the dual function of third brake flashing control and a vehicle back-up flashing light function.

It should be noted that if terminals 17 and 18 are reversed when the control circuit is connected into the third brake light circuit no harm will occur since the circuit then would merely operate as a normal brake light circuit.

Although but one embodiment of the invention has been illustrated and described, it will be apparent to those skilled in the art that various changes and modifications may be made therein without departing from the spirit of the invention or from the scope of the appended claims.

What is claimed is:

1. A vehicle braking system including at least one brake light, means for energizing said brake light including a power source, a brake switch connected between said power source and said brake light and a brake pedal connected to said brake switch, said brake switch being actuated by pressure applied to said brake pedal, a brake alert warning module comprising:

a first means connected between said brake switch and said brake light for rapidly flashing said brake light on and off several times before assuming an on condition, the flashing and the on condition being repeated in a sequential manner, said first means comprising a MOSFET transistor comprising a gate which conducts current to said brake light immediately upon closing of said brake switch and another transistor comprising an anode, cathode and base for controlling the current flow through said MOSFET transistor, a counter, the base of said another transistor being connected to said counter, an oscillator connected to said counter for providing clock pulses to said counter, said counter generating a series of electrical pulses in a cyclic manner for applying to the base of said another transistor, said transistor generating a series of pulses which are applied to said gate of said MOSFET transistor for interrupting in a cyclic manner, current flow through said MOSFET transistor and in turn current flow through said brake light.

2. The vehicle braking system set forth in claim in further combination with:

a second means actuated upon closing of said brake switch for resetting said counter.

3. The vehicle braking system set forth in claim 1 in further combination with: said first means comprising a drive circuit connected to said MOSFET transistor for rendering it conductive upon actuation of said brake switch.

4. The vehicle braking system set forth in claim 1 in further combination with:

a back-up switch actuated by the vehicle upon the transmission being placed in reverse for disabling the reset of said counter to maintain a continuous flashing of said brake light while the vehicle remains in reverse.

* * * * *